United States Patent [19]

Fujii et al.

US005091228A

[11] Patent Number: 5,091,228

[45] Date of Patent: Feb. 25, 1992

[54] LINEAR POLYETHYLENE FILM AND PROCESS FOR PRODUCING THE SAME

[75] Inventors: Toshio Fujii; Kazuhiro Kato; Akihiko Sakai; Yoshinao Shinohara, all of Kurashiki, Japan

[73] Assignee: Mitsubishi Kasei Corporation, Tokyo, Japan

[21] Appl. No.: 720,650

[22] Filed: Jun. 25, 1991

Related U.S. Application Data

[62] Division of Ser. No. 217,930, Jul. 12, 1988, abandoned.

[30] Foreign Application Priority Data

| Jul. 13, 1987 | [JP] | Japan | 62-174527 |
|---|---|---|---|
| Aug. 18, 1987 | [JP] | Japan | 62-204539 |
| Aug. 19, 1987 | [JP] | Japan | 62-205786 |
| Jan. 29, 1988 | [JP] | Japan | 63-19054 |
| Jun. 20, 1988 | [JP] | Japan | 63-151980 |

[51] Int. Cl.$^5$ .................. B32B 1/02; B32B 27/10; B32B 27/32; C08L 23/20; C08L 23/26
[52] U.S. Cl. .................. 428/34.3; 428/34.2; 428/513; 525/240; 525/194; 526/348.1
[58] Field of Search .................. 428/34.3, 513

[56] References Cited

U.S. PATENT DOCUMENTS

| 3,176,052 | 3/1965 | Peticolas | 260/897 |
|---|---|---|---|
| 3,299,194 | 1/1967 | Golike | 264/210 |
| 3,663,662 | 5/1972 | Golike | 260/897 |
| 4,226,905 | 10/1980 | Harbourne | 482/220 |
| 4,258,166 | 3/1981 | Canterino | 526/348.1 |
| 4,354,997 | 10/1982 | Mitzutani | 264/560 |
| 4,367,841 | 1/1983 | Mazumdar | 229/54 |
| 4,463,153 | 7/1984 | Mitzutani | 526/348.1 |
| 4,493,923 | 1/1985 | McCullough, Jr. | 525/88 |
| 4,542,188 | 9/1985 | van de Heijden | 525/240 |
| 4,587,303 | 5/1986 | Turtle | 525/240 |
| 4,588,650 | 5/1986 | Mientus | 428/516 |
| 4,597,920 | 7/1986 | Golike | 264/22 |
| 4,623,581 | 11/1986 | Hert | 428/220 |
| 4,801,652 | 1/1989 | Mitzutani | 526/240 |
| 4,814,135 | 3/1989 | Hientz | 264/564 |
| 4,891,173 | 1/1990 | Saitoh | 241/573 |

FOREIGN PATENT DOCUMENTS

| 0021635 | 1/1981 | European Pat. Off. . |
|---|---|---|
| 0048227 | 12/1982 | European Pat. Off. . |
| 58-126141 | 7/1983 | Japan . |
| 59-178221 | 10/1984 | Japan . |
| 60-072715 | 4/1985 | Japan . |
| 60-180825 | 9/1985 | Japan . |
| 60-183132 | 9/1985 | Japan . |
| 59-18121 | 11/1985 | Japan . |
| 60-245541 | 12/1985 | Japan . |
| 60-257232 | 12/1985 | Japan . |
| 60-275232 | 12/1985 | Japan . |
| 61-229529 | 10/1986 | Japan . |
| 61-273930 | 12/1986 | Japan . |
| 62-039226 | 2/1987 | Japan . |

OTHER PUBLICATIONS

Encyclopedia of Polymer Science & Engineering, 2nd Edition, Wiley-International, 1987, vol. 7, pp. 98–100.

Primary Examiner—Carman J. Seccuro
Attorney, Agent, or Firm—David G. Conlin; Linda M. Buckley

[57] ABSTRACT

Disclosed herein is a monoaxially or biaxially stretched film comprising principally of a linear polyethylene and capable of reduction of thickness to a greater extent than possible with the conventional films of this type.

The film according to the present invention, though incomparably small in thickness, has excellent impact strength, stiffness, tensile strength and tear strength and can be favorably utilized as a film for packaging bags used for packaging relatively heavy commodities.

5 Claims, No Drawings

LINEAR POLYETHYLENE FILM AND PROCESS FOR PRODUCING THE SAME

This is a divisional of copending application(s) Ser. No. 07/217,930 filed on Jul. 12, 1988, now abandoned.

BACKGROUND OF THE INVENTION

The present invention relates to a film having high tear and impact strength, stiffness and tensile strength in the longitudinal direction (stretched direction) and a process for producing the film. More particularly the invention provides a film for packaging bags which comprises principally a linear polyethylene, is capable of greater reduction of thickness than possible with the conventional films and is suitable for packaging the relatively heavy articles such as rice, grain, fertilizers, etc.

High-pressure low-density polyethylenes produced by radical polymerization under the high-temperature and high-pressure conditions have been popularly used as the material of bags or sacks for packaging heavy articles. In recent years, however, such high-pressure low-density polyethylenes have been rapidly superseded by linear polyethylenes, especially linear low-density polyethylenes.

The linear low-density polyethylenes with few branches produced from copolymerization of ethylene and α-olefins have many excellent properties, especially strength properties such as tensile strength, impact strength and stiffness, environmental stress cracking resistance (ESCR), heat resistance, heat-sealing characteristics, etc., in comparison with the high-pressure low-density polyethylenes and are used not only as a material for films for packaging bags but also in various other fields.

The non-stretched films or sheets produced from linear low-density polyethylenes according to a T-die or blown film forming (inflation forming) are incapable of reduction of thickness to an extreme extent due to restrictions on forming operations. Further, such non-stretched films or sheets are poor in strength. To eliminate such problems, it has been proposed to subject such films or sheets to a stretching treatment.

A preferred mode of such treatment is biaxial stretching of the non-stretched films or sheets. This treatment, however, necessarily leads to an increased equipment cost. Also, very strict control of operations is required because of the narrow range of stretching conditions. For these reasons, such biaxial stretching has actually been practiced for production of the films or sheets to be used for certain specific purposes.

The known techniques of longitudinal monoaxial stretching require no high equipment cost and are also easy in operational control, but the involve the problem in anisotropy of the stretched film properties, especially tear strength and surface strength in the longitudinal direction (stretched direction) and were unable to produce the stretched films which could safely be put to practical use.

Generally, the packaging bags made by using linear polyethylenes can be made smaller in thickness and have higher strength than those made by using high-pressure low-density polyethylenes, as for instance disclosed in Japanese Patent Application Laid-Open (KOKAI) No. 61-183132 (1986). But the bags made of. linear polyethylenes lack the strength and tensile strength at break of the body portion for realizing a further reduction of thickness. Japanese Paten Application Laid-Open (KOKAI) No. 62-32134 proposes two-layer laminating of the stretched films to improve tensile strength at break of the body portion. In a bag produced from such films, however, when the bag is dropped with the sealed portion down, the body portion of the bag could be elongated in the circumferential direction and deformed, so that such bag is not suitable for practical use. Also, such packaging bag because of its poor stiffness, had the problem of improper filling due to adhesion of the inner faces thereof or buckling of the body portion at the time of automatic filling.

In view of the above, the present inventors have pursued their studies for eliminating said problems of the prior art and producing a thin (stretched) film with excellent strength properties by using linear polyethylenes as the material and, as a result, found that a film having a specific range of heat shrinkage obtained by molding a specific linear polyethylene into a non-stretched film or sheet and stretching it under the specific conditions has excellent tear strength, impact strength, stiffness and tensile strength even when reduced in thickness, and that use of such film for making a packaging bag can improve the stiffness of the packaging bag an its deformation properties under dropping while maintaining the strength of the body portion. The present invention have been accomplished on the basis of this finding.

SUMMARY OF THE INVENTION:

In a first aspect of the present invention, there is provided a mono- or biaxially stretched film having a heat shrinkage of 20% or more in one of the longitudinal and transverse directions and 60% or more in the other direction, comprising 100 to 50 parts by weight of a linear polyethylene having a density of 0.910 to 0.965 g/cm$^3$, a melt index of 2 g/10 min or less and a fluidity ratio of 50 or below; 0 to 50 parts by weight of a branched low-density polyethylene having a melt index of 2 g/10 min or less, a fluidity ratio of 70 or below and a density of 0.930 g/cm$^3$ or below; and 0.0001 to 0.1 part by weight of a radical initiator as an optional component.

In a second aspect of the present invention, there is provided a process for producing a mono- or biaxially stretched film having a heat shrinkage of 20% or more in one of the longitudinal and transverse directions and 60% or more in the other direction produced by monoaxially stretching in the longitudinal or transverse direction or biaxially stretching which comprises a composition of 100 to 50 parts by weight of a linear polyethylene having a density of 0.910 to 0.965 g/cm$^3$, a melt index of 2 g/10 min or less and a fluidity ratio of 50 or below; 0 to 50 parts by weight of a branched low-density polyethylene having a melt index of 2 g/10 min or less, a fluidity ratio of 70 or below and a density of 0.930 g/cm$^3$ or below; and 0.0001 to 0.1 part by weight of a radical initiator as an optional component.

In a third aspect of the present invention, there is provided a longitudinally monoaxially stretched film having a heat shrinkage of 20% or more in one of the longitudinal and transverse directions and 60% or more in the other direction, comprising 100 to 50 parts by weight of a linear polyethylene having a density of 0.91 to 0.965 g/cm$^3$, a melt index of 2 g/10 min or less and a fluidity ratio of higher than 50 and not higher than 120, and 0 to 50 parts by weight of a branched low-density polyethylene having a density of 0.930 g/cm$^3$ or below, a melt index of 2 g/10 min or less and a fluidity ratio of 70 or below.

In a fourth aspect of the present invention, there is provided a process for producing a film which comprises subjecting a composition comprising 100 to 50 parts by weight of a linear polyethylene having a density of 0.91 to 0.965 g/cm$^3$, a melt index of 2 g/10 min or less and a fluidity ratio of higher than 50 and not higher than 120, and 0 to 50 parts by weight of a branched low-density polyethylene having a density of 0.930 g/cm$^3$ or below, a melt index of 2 g/10 min or less and a fluidity ratio of 70 or below, to blown film forming under the conditions of blow-up ratio of 2 to 8 and frost line height of 2 to 50 times the die diameter, to obtain a non-stretched film or sheet, and monoaxially stretching said non-stretched film or sheet by 1.5 to 8 times the original length in the longitudinal direction at a temperature of Tm $-70°$ C. to Tm $-20°$ C. wherein Tm is the melting point of said composition.

DETAILED DESCRIPTION OF THE INVENTION

The present invention relates to a film having a heat shrinkage of 20% or more in one of the longitudinal and transverse directions and 60% or more in the other direction, which is obtained by forming a non-stretched film or sheet from a composition comprising a linear polyethylene and a branched low-density polyethylene, and monoaxially or biaxially stretching the non-stretched film or sheet under specific conditions.

The present invention also relates to a process for producing the film.

The present invention will be described more in detail below.

A linear low-density polyethylene having a density of 0.91 to 0.95 g/cm$^3$ and a high-density polyethylene having a density of 0.965 g/cm$^3$ or below are used as the linear polyethylene used in the present invention.

The linear low-density polyethylene is a copolymer of ethylene and other α-olefin and different from the conventional branched low-density polyethylenes produced by the high-pressure process. Such linear low-density polyethylene is produced, for example, by copolymerizing ethylene with 4 to 17% by weight, preferably 5 to 15% by weight of other α-olefin such as butene, hexene, octene, decene, 4-methyl-1-pentene, etc., in the presence of a Ziegler or Phillips catalyst which is generally used in the production of moderate- to low-pressure high-density polyethylenes. The linear low-density polyethylene is lowered in its density to the order of 0.91 to 0.95 g/cm$^3$ due to a molecular structure having short branchings of the copolymerizing components. Thus, this polyethylene has a linearlity of the chains higher than the conventional branched low-density polyethylenes, and is of a structure having a greater number of branches than high-density polyethylenes.

The high-density polyethylene used as another component of the linear polyethylene is an ethylene homopolymer obtained by polymerizing ethylene alone by using a Ziegler or Phillips catalyst and having a density of 0.965 g/cm$^3$ or below.

As the linear polyethylene in this invention, the linear low-density polyethylene and high-density polyethylene are used alone or as a mixture thereof. When they are used as a mixture, the mixing ratio is not strictly limited Preferably said linear polyethylene has a melt index of not higher than 2 g/10 min, preferably not higher than 1 g/10 min, more preferably in the range of 0.001 to 1 g/10 min.

When the linear polyethylene has a melt index higher than 2 g/10 min, the surface strength tends to be lowered.

It is further preferred that the linear polyethylene has a density in the range of 0.910 to 0.965 g/cm$^3$, preferably 0.910 to 0.950 g/cm$^3$, more preferably 0.915 to 0.940 g/cm$^3$ When the linear polyethylene has a density above 0.965 g/cm$^3$, the impact resistance is greatly deteriorated, and when the linear polyethylene is of a density below 0.910 g/cm3, both stiffness and tensile strength are lowered In the present invention, the values of melt index are those determined according to the formula 4 in Table 1 of JIS K 7210 which is the standard referred to in JIS K 6760. Fluidity ratio represents the ratio of extrusion rates (g/10 min) under shearing force of 10$^6$ dyn/cm2 (load of 11,131 g) and 10$^5$ dyn/cm$^2$ (load of 1,113 g) and is calculated from:

$$\text{Fluidity ratio} = \frac{\text{extrusion rate under load of 11,131 g (for 10 min)}}{\text{extrusion rate under load of 1,113 g (for 10 min)}}$$

Density was measured according to JIS K 6760.

Fluidity ratio is discussed as a possible index of molecular weight distribution of the resin used. That is, a small value of fluidity ratio represents a sharp molecular weight distribution and a large value of fluidity ratio represents a broad molecular weight distribution.

In the present invention, the linear polyethylene alone may be used, but it is preferred to blend a specified amount of a branched low-density polyethylene in the linear polyethylene used as base, because in the latter case the film-forming properties and stretchability are improved.

The branched low-density polyethylenes that can be blended in the linear polyethylene in the present invention include ethylene homopolymers and copolymers of ethylene and other copolymerizable materials.

Examples of the copolymerizable materials are vinyl compounds such as vinyl acetate, ethyl acrylate, methyl acrylate, etc., and olefins having 3 or more carbon atoms such as hexene, propylene, octene, 4-methyl-1-pentene, etc. The amount of such copolymerizable material used in the copolymerization is in the range of 0.5 to 18% by weight, preferably 2 to 10% by weight. These branched low-density polyethylenes are preferably the ones obtained from radical polymerization using a radical initiator such as oxygen, organic peroxides, etc., according to a known high-pressure (1,000-3,000 kg/cm$^2$) process.

The branched low-density polyethylene used in the present invention is the one having a melt index of not exceeding 2 g/10 min, preferably in the range of 0.1 to 1 g/10 min, and a fluidity ratio of not greater than 70, preferably in the range of 30 to 70. When the melt index of the branched low-density polyethylene is outside the range, the strength of the produced film is lowered and when such film is made into a packaging bag, the strength of its body portion proves low. The same holds true when fluidity ratio of the branched low-density polyethylene is outside the range. It is further preferred that the branched low-density polyethylene has a density of not exceeding 0.930 g/cm$^3$, preferably in the range of 0.915 to 0.925 g/cm$^3$, for attaining an improvement of strength of the film as well as an improvement of body strength and heat-seal strength of the bag made from such film.

The blending ratio of the branched low-density polyethylene to the linear polyethylene is 0-50 parts by weight, preferably 10-30 parts by weight of branched low-density polyethylene to 100-50 parts by weight, preferably 90-70 parts by weight of linear polyethylene.

In the present invention, a radical initiator may be added to the linear polyethylene or a blend of the linear polyethylene and the branched low-density polyethylene. Addition of such radical initiator is preferable as it improves film-forming properties and the other properties, especially strength, of the produced film.

The radical initiator used in the present invention is preferably of the type whose decomposition temperature at which the half-life period is one minute is in the range of 130°-300° C., the examples of such radical forming agent being dicumyl peroxide, 2,5-dimethyl-2,5-di(t-butylperoxy)hexane, 2,5-dimethyl-2,5-di(t-butylperoxy)-hexyne-3, α,α'-bis(t-butylperoxyisopropyl)benzene, dibenzoyl peroxide, di-t-butyl peroxide and the like.

The amount of such radical initiator blended is not more than 0.1 part by weight, preferably 0.0001 to 0.1 part by weight, more preferably 0.001 to 0.1 part by weight based on the amount of the linear polyethylene or the total amount of the linear polyethylene and branched low-density polyethylene. Use of the radical initiator in excess of the amount results in a too low melt index, which tends to cause film break or melt fracture in the course of blown film forming.

In the present invention, any suitable method may be employed for blending the radical initiator in the linear polyethylene and branched low-density polyethylene, and decomposing and reacting such radical initiator with the polyethylenes For instance, the following methods may be employed.

(1) The linear polyethylene, branched low-density polyethylene and radical initiator are fed simultaneously or successively and melt extruded at the time of inflation molding.

(2) By using an extruder and/or a kneader such as Banbury mixer, the linear polyethylene, branched low-density polyethylene and radical initiator are mixed and reacted, then pelletized and subjected to inflation molding.

(3) There is first prepared a pelletized master batch by blending an excess amount of radical initiator (usually 5,000-10,000 ppm) in a polyethylene such as linear low-density polyethylene, branched low-density polyethylene and high-density polyethylene and mixing and melting them at a temperature above the melting point of the polyethylene and below a temperature at which no substantial decomposition of the radical initiator is caused, and this master batch is blended with the linear polyethylene or a mixture of the linear polyethylene and branched low-density polyethylene and subjected to blown film forming.

The radical initiator may be used either in the form as it is or in the form of a solution in a solvent.

The reaction of the linear polyethylene and branched low-density polyethylene with the radical initiator causes intermolecular coupling of the polyethylenes to increase the high-molecular weight component and make it possible to obtain a modified polyethylene with a reduced melt index. Such modified polyethylene is more liable to be oriented in the transverse direction at the time of blown film forming than the non-modified linear polyethylene or the blend of the non-modified linear polyethylene and non-modified branched low-density polyethylene, and the film produced therefrom, when subjected to a stretching treatment, is markedly improved in longitudinal tear strength and impact strength.

The polyethylene resin comprising the linear polyethylene or a blend of the linear polyethylene and branched low-density polyethylene or a modified version thereof may contain according to necessity a known additive or additives such as antioxidant, ultraviolet absorber, antistatic agent, slip agent, etc., which are usually used in the preparation of polyethylene products.

In the present invention, the composition prepared by adding a radical initiator to the linear polyethylene or a mixture of the linear polyethylene and branched low-density polyethylene is formed into a non-stretched film by the inflation method and this non-stretched film is then stretched in the longitudinal direction (film take-up direction) to form a stretched film.

Blown film forming of the non-stretched film is carried out under the conditions where the blow-up ratio is 2-8, preferably 3-8, and the frost line height (height from die surface to frost line) is 2-50 times, preferably 5-50 times the die diameter. When the blow-up ratio is below the range, both longitudinal tear strength and impact strength of the film are lowered, while when the blow-up ratio is higher than the range, the bubble forming stability is deteriorated. Also, when the frost line height is below the range, the longitudinal tear strength of the film is reduced, while when the frost line height is above the range, the bubble forming stability is deteriorated.

The non-stretched film is then monoaxially stretched in the longitudinal direction at a temperature of Tm −70° to Tm −20° C. (Tm being the melting point of the polyethylene composition comprising the non-stretched film at a stretch ratio of 1.5 to 8.

The stretching temperature is in the range from Tm −70° to Tm −20° C., preferably Tm −60° to Tm −30° C. At a temperature below the range, there may take place non-uniform stretch of the film. At a temperature above the range, the produced film is greatly lowered in impact strength.

The film is stretched at a stretch ratio of 1.5 to 8, preferably 2 to 5. When the stretch ratio is less than 1.5, no desired effect of stretching is provided, resulting in an unsatisfactory stiffness and tensile strength of the film. When the stretch ratio exceeds 8, the stretched film has excessive molecular orientation in the longitudinal direction, resulting in a reduction of longitudinal tear strength of the film.

In the above process for producing the monoaxially stretched film, a linear polyethylene having a melt index of 2 g/10 min or below, preferably 1 g/10 min or below, more preferably in the range of 0.001 to 1 g/10 min, and a fluidity ratio of 50 or below, preferably in the range of 10 to 50 is preferably used. When the fluidity ratio is above 50, the surface strength of the produced film may be undesirably lowered. As the branched low-density polyethylene, one having a melt index of 2 g/10 min or below, preferably in the range of 0.1 to 1 g/10 min, and a fluidity ratio of 70 or below, preferably in the range of 30 to 70 is used. When the fluidity ratio is above 70, the surface strength of the produced film is lowered and when such film is made into a packaging bag, the strength of its body portion proves low.

According to the same process as the above-described process except for stretching at a temperature of Tm −70° to Tm −20° C., preferably Tm −60° to Tm −30° C. (Tm being the melting point of the composition comprising a linear low-density polyethylene and a branched low-density polyethylene), it is possible to obtain a longitudinally monoaxially stretched film having a heat shrinkage of 20% or more in one of the longitudinal and transverse directions and 60% or more in the other direction by using a composition comprising 100 to 50 parts by weight of a linear polyethylene having a density of 0.91 to 0.965 g/cm$^3$, a melt index of 2 g/10 min or less and a fluidity ratio of larger than 50 and not larger than 120, and 0 to 50 parts by weight of a branched low-density polyethylene having a density of 0.930 g/cm$^3$ or below, a melt index of 2 g/10 min or less and a fluidity ratio of 70 or below.

The linear polyethylene used in the above process is the one having a density in the range of 0.91 to 0.965 g/cm$^3$, preferably 0.91 to 0.95 g/cm$^3$, more preferably 0.915 to 0.940 g/cm$^3$, a melt index of 2 g/10 min or less, preferably 0 1 to 1 g/10 min or less, and a fluidity ratio in the range of higher than 50 and not higher than 120, preferably 60 to 90.

When the density of the linear low-density polyethylene used is below the range, there can not be obtained the desired stiffness and tensile strength of the film, and when the density is above the range, the produced film proves remarkedly poor in impact strength. When the melt index of the linear polyethylene is above 2 g/10 min, the film is not provided with desired strength. Either when the fluidity ratio of the linear polyethylene is above or below the range, there results a deterioration of processability and strength.

In the process described above, it is possible to use linear polyethylenes having a relatively broad molecular weight distribution with the fluidity ratio of higher than 50 and not higher than 120. Any known method can be used for the preparation of linear polyethylene having a broad molecular weight distribution. For example, there can be favorably employed a method in which a blend of polymers with different molecular weights is produced by using two or more polymerization vessel. The linear polyethylene alone may be used, but it is preferred to blend a specified amount of a branched low-density polyethylene in the linear low-density polyethylene as such blend improves the film processability and tensile properties. The "branched low-density polyethylene" refers to the same ethylene homopolymers and copolymers of ethylene and other copolymerizable materials as mentioned above, but in the composition described above, there are used those having a melt index not exceeding 2 g/10 min. preferably in the range of 0.1 to 1 g/10 min, and a fluidity ratio not higher than 70, preferably in the range of 30 to 70. When the melt index is above 2 g/10 min, the produced film proves poor in strength. A deterioration of strength of the produced film is also seen when the fluidity ratio of the linear polyethylene is higher than the range. It is also preferable for the improvement of strength of the film that the branched low-density polyethylene has a density in the range of 0.91 to 0.930 g/cm$^3$, preferably 0.915 to 0.925 g/cm$^3$.

The amount of said branched low-density polyethylene to be blended in the linear polyethylene is in the range of 0 to 50 parts by weight, preferably 10 to 30 parts by weight, to 100 to 50 parts by weight, preferably 90 to 70 parts by weight of the linear polyethylene.

In the case of using the composition, mentioned above, which comprises 100 to 50 parts by weight of a linear polyethylene having a density of 0.910 to 0.965 g/cm$^3$, a melt index of 2 g/10 min or less and a fluidity ratio of 50 or below; 0 to 50 parts by weight of a branched low-density polyethylene having a density of 0.930 g/cm$^3$ or below, a melt index of 2 g/10 min or less and a fluidity ratio of 70 or below; and 0.0001 to 0.1 part by weight of a radical initiator as an optional component, the following method may be also employed to form the film according to the present invention.

By employing an ordinary film or sheet forming equipment and method, for example, blown film forming method using a circular die or T-die method, the above composition is formed at a resin temperature of 150°–250° C. and a draft ratio of 1 to 50 to obtain a non-stretched film or sheet. Then this non-stretched film or sheet is stretched in at least one of the longitudinal and transverse directions so that the surface area of said film or sheet is stretched 1.2 to 9 times the original area to obtain a stretched film.

Stretching of the non-stretched film or sheet is performed either by monoaxially stretching it in the transverse direction (the direction orthogonal to the film take-up direction of the film forming machine) or by biaxially stretching the film or sheet in both longitudinal direction (film take-up direction) and transverse direction.

Monoaxial stretching in the transverse direction can be accomplished, for example, in the following way. The non-stretched film obtained by the T-die method or blown film forming method is slit to a desired width and heated, and then stretched in the transverse direction under heating with the ends of the film fixed.

In the case of biaxial stretching, the non-stretched film obtained by the T-die method or blown film forming method is slit to a desired width and stretched in both longitudinal and transverse directions either successively or simultaneously. In the case of successive stretching, the film is first stretched in the longitudinal direction and then stretched in the transverse direction, or vice versa. In the case of simultaneous biaxial stretching, the time allocation for longitudinal and transverse stretching is optional, for example, longitudinal stretching may be continued gradually until transverse stretching is completed, or stretching in both longitudinal and transverse directions may be started simultaneously, or stretching in the longitudinal direction may be completed first.

Tentering method, successive biaxial stretching method, tubular stretching method and simultaneous biaxial stretching method can be favorably used for the biaxial stretching in the present invention. The stretching temperature is in the range of Tm −70° to Tm −5° C., preferably Tm −60° to Tm −15° C. (Tm being the melting point of the composition of the linear polyethylene and the branched low-density polyethylene, or the modified polyethylene composition obtained therefrom by the reaction of the radical initiator). At a temperature lower than Tm −70° C., the mobility of molecular chain is so poor that the film tends to break when stretched, and even if the film could be stretched, the desired stretch ratio would not be attained, making it unable to obtain a stretched film with excellent properties. At a temperature higher than Tm −5° C., the non-stretched film may be partly melted and becomes unable to have desired orientation, so that in this case, too, it is impossible to obtain a stretched film with excellent properties.

The stretching rate is in the range of 2 to 40%/sec, preferably 10 to 20%/sec. A stretching rate lower than 2%/sec tends to impair the stretchability due to oriented crystallization in the course of stretching, while a stretching rate higher than 40%/sec will make the polymer deformation unable to keep pace with the stretching rate to cause break of the film during stretching.

In view of the stretching workability (easiness to stretch) and the properties of the obtained stretched film the stretch ratio is in the range of 1.2 to 9 times, preferably 1.2 to 5 times, more preferably 1.5 to 5 times in terms of a real stretch ratio (in the case of transverse monoaxial stretching, the stretch ratio in the longitudinal direction is supposed to be 1) in the transverse direction or in both longitudinal and transverse directions. In the case of biaxial stretching, the film is stretched 1.2 to 3 times, preferably 1.2 to 2 times in the longitudinal direction and 3 to 7.5 times, preferably 4 to 7 times in the transverse direction. When the areal stretch ratio is less than 1.2 times, there can not be obtained the desired effect of improvement of strength properties and tensile strength at break of the film. When the areal stretch ratio is greater than 9 times, the stretching workability is deteriorated to make it unable to obtain a satisfactory stretched film.

The monoaxially or biaxially stretched film of the present invention produced according to the above-mentioned processes by using the composition preferably has a thickness of 30 to 120 $\mu$m, more preferably 40 to 100 $\mu$m, and a heat shrinkage of 20% or more, preferably 30% or more in one of the longitudinal and transverse directions and 60% or more, preferably 70% or more in the other direction. The monoaxially or biaxially stretched film of this invention can be favorably used for a packaging bag, but in case the heat shrinkage of the film in at least one direction is less than said values, the bag made therefrom is found unsatisfactory in deformability and stiffness when the bag is dropped.

The known methods can be employed for producing a packaging bag by using the stretched film of the present invention. For example, the following methods may be employed.

(1) The stretched film is turned into a cylindrical form by heat-sealing both edges thereof or by sealing both edges with an adhesive (hereinafter referred to as adhesive sealing), and then the top and bottom of this cylindrical film are closed by heat sealing, adhesive sealing or sewing to form a bag.

(2) Both top and bottom ends of the cylindrical stretched film are heat-sealed or adhesive-sealed, and then the side edges are joined by heat sealing, adhesive sealing or sewing.

When heat sealing is employed for joining the edges in the production of the packaging bag, such heat sealing is preferably conducted so that the direction of heat sealing will coincide with the direction in which the heat shrinkage of the stretched film is small. When the part to be heat-sealed is kept pressed for a long time by a heating means such as heat bar or heat belt used in heat sealing, there may take place thermal relaxation to weaken the strength of the heat-sealed part, so that it is preferable to employ a method in which the part to be heat-sealed is heated quickly at a temperature of about 230°–280° C. with no pressing force applied thereto to keep it in a free state so that shrinkage will occur at the heat-sealed part.

It is also possible to form a double-wall bag by using the mono- or biaxially stretched film of the present invention as the inner bag while using paper for the outer bag. The paper used for the outer bag is not limited to specific types. Any type of paper generally used for the industrial packaging materials is usable in the present invention. Kraft paper, extensible paper and the like are especially preferred. The basis weight (weight per unit area, an index of thickness) of such paper is in the range of 73 to 88 g/m$^2$. Also, such paper may be polyethylene-laminated on the inside.

Known methods are employable for producing such double-wall packaging bag.

The outer and inner bags that constitute the double-wall packaging bag may be simply lapped one over the other or may be bonded together with an adhesive.

Sealing may be also effected by known methods, for example, (1) the inner bag is heat-sealed or adhesive-sealed, and the outer bag is sewn up, or (2) both inner and outer bags are sewn up.

Heat sealing in the production of the inner bag is preferably conducted in the same way as described above.

The double-wall bag obtained in the manner described above is free of the problems accompanying the conventional bags of this type, such as multi-wall kraft bag using polyethylene or nylon films, cross-laminated kraft bag made by laminating woven fabrics made of stretched cords of synthetic resin on kraft paper, and bags made of synthetic resin films alone, which problems include wetting of the contained material and break of bag due to wetting with water, high production cost due to complication of the production process, break of bag by a protuberance or other object during transport, phenomenon that when the filled bag is carried with hands, the finger tips holding the bag penetrate into the bag, and other troubles resulting from the reduced tensile strength at break of the body portion of the bag due to reduction of film thickness of the bag. Further, the bag made by using the stretched film according to the present invention is excellent in water resistance, mechanical strength and anti-slip properties and suited for packaging and transporting heavy materials.

The present invention will hereinafter be described more in detail referring to the following non-limitative examples.

Example 1

(1) Production of stretched film

Eighty parts by weight of a linear low-density polyethylene (MI: 0.5 g/10 min, fluidity ratio: 20, density: 0.921 g/cm$^3$, copolymerized material: butene-1, amount thereof copolymerized: 10% by weight, melting point: 118° C.) and 20 parts by weight of a high-pressure branched low-density polyethylene (MI: 0.4 g/10 min, fluidity ratio: 45, density: 0.922 g/cm$^3$) were dry blended (melting point of the mixture: 118° C.), and this blend was further mixed with 0.03 part by weight of 2,5-dimethyl-2,5-di(t-butyl-peroxy)hexyne-3 to prepare the starting material. This starting material was formed into a blown film under the conditions of extrusion rate of 80 kg/hr, blow-up ratio (BUR) of 3 and frost line hight/die diameter (FLH/D) of 8 by using a blown film extrusion equipment (a Modern Machinary's extruder Delser 65φ) adapted with an inflation die having a circular slit with a diameter of 250 mm and a width of 4 mm and a cooling air ring. This base film was slit in the film take-up direction and stretched by using a roll stretcher at a stretching temperature of 80° C. and a stretch ratio of 3 (in the longitudinal direction) to obtain a longitudinally monoaxially stretched film having a thickness of 80 μm.

Evaluation methods (a) Film strength

Elemendorf tear strength was measured according to JIS P8116, and dart drop impact (DDI) test was conducted according to ASTM D1709.

(b) Strength against finger penetration

For examining tensile strength of the film, the test for strength against finger penetration was conducted in the following way.

The longitudinally stretched film obtained and described in (1) above was cut to a length of 760 mm in the stretched direction and then cut to a length of 1,000 mm in the transverse direction (widthwise direction of the film). This piece of film was rounded up and joined edgewise so that the lapped portion would measure 60 mm in width. A hot melt adhesive (Grade HX-960 made by Nitta Gelatin Co., Ltd.) was applied to said lapped portion and then this portion was heated and bonded by a hot gun to form a cylindrical body. Either top or bottom of this cylindrical body was heat sealed by using a heat sealer (Model HS 22B-Z made by New Long Co., Ltd.) to form a bag. This bag was packed with 20 kg of fertilizer and the opening of the bag was heat sealed in the same way as described above to obtain a packaging bag for testing. This bag containing 20 kg of fertilizer was lifted up with the hands so that the heat sealed portion would be parallel to the floor surface, and it was observed whether the finger tips would bite into the film surface of the bag.

Evaluation

A: The finger tips didn't bite into the bag film at all. No problem at all.

B: The finger tips bit slightly into the bag film, but no serious problem was posed.

C: The finger tips bit largely into the bag film, posing the serious problem.

(c) Determination of heat shrinkage

A circular test piece of 6 mm in diameter was cut out from a suitable position of the film. This test piece was placed on a hot plate having a surface temperature of 200° C. for 20 seconds and the changes in length in the longitudinal direction (film take-up direction) and in the transverse direction (film widthwise direction) were measured and shown by percent to the original lengths The results are shown in Table 1.

Example 2

A stretched film was obtained and a packaging bag was made therefrom in the same way as Example 1 except that a mixture of 100 parts by weight of the same linear low-density polyethylene as used in Example 1 and 0.03 part by weight of 2,5-dimethyl-2,5-di(t-butylperoxy)hexyne-3 was used as the starting material, and that FLH/D was adjusted to 15. The results are shown in Table 1.

Comparative Example 1

The procedure of Example 1 was followed except that the blow-up ratio (BUR) was changed to 1.5.

Comparative Examples 2–6

The procedure of Example 1 was followed except that the amounts of linear polyethylene and radical initiator, the forming conditions and the stretching conditions were changed as shown in Table 1.

Example 3

Two types of linear polyethylene having a butene-1 content of 4.5% by weight and MI of 200 and 0.055, respectively, were prepared by using a solid catalyst obtained by reacting 5 g of magnesium ethylate and 50 cc of titanium tetrachloride at 130° C. Ten kg each of said two types of linear polyethylene were mixed with 0.05 part by weight of 2,6-ditertialybutyl-paracresol (BHT) and 0.05 part by weight of calcium stearate, and mixed well by Banbury mixer.

The thus obtained modified linear polyethylene had an MI of 0.3 g/10 min, a fluidity ratio of 70 and a density of 0.93 g/cm$^3$.

This modified linear polyethylene was formed into a 200 μm thick blown film under the conditions of extrusion rate of 80 kg/hr, BUR of 3 and FLH/D of 8 by using a similar blown film extrusion equipment (Modern Machinary's Delser 65φ extruder) to that used in Example 1. This base film was slit in the film take-up direction and stretched under the conditions of stretching temperature of 80° C. and stretch ratio of 3 (in the longitudinal direction) by using a roll stretcher to obtain an 80 μm thick monoaxially (longitudinally) stretched film. The results are shown in Table 2.

Example 4

The procedure of Example 3 was followed except for use of a blend of 80 parts by weight of modified linear polyethylene of Example 3 and 20 parts by weight of a branched low-density polyethylene having an MI of 0.4 g/10 min, a fluidity ratio of 40 and a density of 0.922 g/cm$^3$.

The results are shown in Table 2.

Example 5

To 100 parts by weight of a linear polyethylene having an MI of 0.5 g/10 min, a fluidity ratio of 20, a density of 0.921 g/cm$^3$ and a butene-1 content of 8% by weight, was added 0.03 part by weight of 2,5-dimethyl-2,5-di(t-butylperoxy)hexyne-3, and the mixture was treated at 250° C. by using a Modern Machinary's 50 mmφ extruder to obtain a modified linear polyethylene having an MI of 0.12 and a fluidity ratio of 75.

By using a blend of 80 parts by weight of said modified linear polyethylene and 20 parts by weight of the branched low-density polyethylene used in Example 4, a monoaxially stretched film was produced by following the procedure of Example 3.

The results are shown in Table 2.

Comparative Examples 7–12

The procedure of Example 3 was followed except for the changes of the compositions of the resins used and the forming conditions as shown in Table 2.

The results are shown in Table 2.

Example 6

(1) Preparation of stretched film

Used as the starting material was a dry blend (melting point: 118° C) of 90 parts by weight of a linear low-density polyethylene (MI: 0.5 g/10 min, fluidity ratio 20, density: 0.921 g/cm$^3$, copolymerized material: butene-1, amount thereof 10% by weight) and 10 parts by weight of a high-pressure branched low-density polyethylene (MI: 0.4 g/10 min, fluidity ratio: 20, density 0.922 g/cm$^3$). This starting material was formed into a 300 μm thick blown film under the conditions of extrusion rate of 50 kg/hr, BUR of 2 and draft ratio of 6.7 by using the same blown film extrusion equipment as used in Example 3. This base film was slit in the film take-up direction and stretched by using a tenter type successive biaxial stretching machine under the conditions of stretching temperature of 105° C., stretching rate of 10%/sec, and stretch ratio of 1.2 in the longitudinal direction and 5 in the transverse direction to produce a biaxially stretched film having a thickness of 50 μm.

The thus obtained stretched film was rounded up and joined edgewise so that the lapped portion would measure 100 mm in width. Then said lapped portion, after applying thereto a hot melt adhesive (Grade HX-960 available from Nitta Gelatin Co., Ltd.), was heated and bonded by using a hot gun to form a cylindrical body designed to serve as an inner bag having an internal volume of 25 kg). Then an outer bag made of extensive paper having a basis weight of 83 g/m$^2$ was fitted around said cylindrical inner bag to form a double-wall cylindrical body, and the bottom end of this double-wall cylindrical body was sewn up at a pitch of 7 m/m by using New Long's DS-5 sewing machine to made a double-wall bag.

This double-wall bag was packed with 25 kg of polyethylene chips and then the top end of the bag was sewn up in the same way as described above.

Performance tests of packaging bag

(1) Drop test

The double-wall bag was dropped onto a concrete surface with the bag placed parallel to the concrete surface from a height of 1.5 meters. The bag was dropped 10 times in all, 5 times with the same side down and 5 times with the opposite side down. The drop test was made on 20 bags, and the number of times of drop conducted till the bag was broken was counted. The average of the 20 bags was calculated.

(2) Transport test

1) There were prepared 500 bags each being packed with 25 kg of chips. These bags were loaded in a pallet and transported by a freight car over a distance of 400 km. Upon arrival at the destination, the number of the bags which were broken during the transport was counted.

2) Of the bags loaded in the pallet in 1) above the number of crumbled bags during transport was counted after arrival at the destination.

Example 7

The procedure of Example 6 was followed except that a mixture obtained by mixing 0.03 part by weight of 2,5-dimethyl-2,5-di(t-butylperoxy)hexyne-3 to a dry blend of 90 parts by weight of a linear low-density polyethylene and 10 parts by weight of a high-pressure branched low-density polyethylene was used as starting material, and that said starting material was formed under the conditions shown in Table 3. The results are shown in Table 3.

Comparative Example 13

The procedure of Example 6 was followed except that a double-wall kraft packaging bag was made without using any polyethylene resin but by using paper (extensive paper) having a basis weight of 83 g/m$^2$) alone. The results are shown in Table 3.

Comparative Example 14

The procedure of Example 6 was followed except that no paper was used and the forming conditions were changed as shown in Table 3 to make a single-wall polyethylene film bag. The results are shown in Table 3.

Comparative Example 15

The procedure of Example 6 was followed except that the forming conditions were changed as shown in Table 3. The results are shown n Table 3.

Example 8

(1) Preparation of stretched film

Used as starting material was a dry blend of 90 parts by weight of a linear low-density polyethylene (MI: 0.5 g/10 min, fluidity ratio: 20, density: 0.921 g/cm$^3$, copolymerized material: butene-1, amount thereof: 10% by weight) and 10 parts by weight of a high-pressure branched low-density polyethylene (MI: 0.4 g/10 min, fluidity ratio: 20, density: 0.922 g/cm$^3$). This starting material was formed into a 450 μm thick blown film under the conditions of extrusion rate of 50 kg/hr, BUR of 2 and draft ratio of 6.7 by using the same blown film extrusion equipment as used in Example 3. This base film was slit in the film take-up direction and stretched by using a tenter type successive biaxial stretcher under the conditions of stretching temperature of 105° C., stretching rate of 10%/sec, and stretch ratio of 1.5 in the longitudinal direction and 3 in the transverse direction to produce a biaxially stretched film having a thickness of 100 μm.

For deciding the heat sealing direction in producing a packaging bag from said biaxially stretched film, the heat shrinkage of the film was determined according to the method in Example 1. The results are shown in Table 4.

Based on the obtained results of determination of heat shrinkage, the direction of smaller heat shrinkage was decided as the heat sealed direction (corresponding to the top and bottom openings of the bag) and the direction of greater heat shrinkage was decided as the adhesive-sealed direction (corresponding to the body portion of the bag).

(2) Production of packaging bag

The biaxially stretched film obtained according to (1) above was cut to a length of 890 mm in the direction of smaller heat shrinkage, viz. the longitudinal direction (film take-up direction) and to a length of 670 mm in the direction of greater heat shrinkage, viz. the transverse direction (film widthwise direction). This piece of film was rounded and joined edgewise so that the lapped portion would measure 100 mm in width. Then the lapped portion, after applying thereto a hot melt adhesive (Grade HX-960 made by Nitta Gelatin Co., Ltd.), was heated and bonded by using a hot gun to form a cylindrical body. One side of one of the openings of said cylindrical film was heat sealed at a position of 1.5 cm from the end by using a New Long's heat sealer Model HS 22B-2 (length of heating section: 150 mm, clearance of heating section: 0.3 mm, length of cooling section 150 mm, clearance of cooling section: 1 mm) under the conditions of heat sealing temperature (heating section surface temperature) of 250° C., cooling section temperature of 30° C. and film feed rate of 15 m/sec. The heat sealed portion was shrunk in the film take-up direction (longitudinal direction) and had a thickness greater than the original film thickness.

The obtained bag was packed with 20 kg of fertilizer and then the opening was heat sealed under the same conditions as described above to obtain a packaging bag for drop test.

(3) Performance tests of packaging bag (A) Drop test

The packaging bags obtained according to (2) above were subjected to a sidewise drop test and a lengthwise drop test in the manners described below.

The sidewise drop test was conducted by keeping the test room temperature at −10° C. and the lengthwise drop test at −5° C. Each bag was dropped 5 times from a height of 1.5 meters. The percent of the number of broken bags to the total number of bags tested was determined and shown as broken bag ratio The results are shown in Table 4.

(a) Sidewise drop test

Each packed bag was dropped in such a way that the body portion of the bag would remain parallel to the floor surface while the heat sealed portion substantially vertical thereto. The test was conducted by dropping 20 bags in said way, and the broken bag ratio was calculated. This sidewise drop test was made for determining the strength of the heat sealed portion.

(b) Lengthwise drop test 20 bags were dropped in such a way that the heat sealed portion of the bag would remain parallel to the floor surface while the body portion substantially vertical thereto, and the broken bag ratio was calculated. This lengthwise drop test was made for determining the strength of the body portion.

(B) Deformation test

The bags obtained according to (2) described above were subjected to the lengthwise drop test described in (A)(b) above, and the circumferential length of the body portion of the bag before drop and that after drop were measured. The degree of deformation (hereinafter referred to as deformation strength ratio) was determined from the following formula:

$$\text{Deformation strength ratio} = \frac{\text{circumferential length of body portion of bag after drop}}{\text{circumferential length of body portion of bag before drop}}$$

A high deformation strength ratio signifies a high deforming aptitude of the bag.

(C) Film stiffness

This was determined in the following way by using a film stiffness tester made by Toyo Fine Machinary Co., Ltd. An 80×100 mm sample (film used for said packaging bag) was placed flat on a sample holder and both ends were clamped to a chuck. Since a marginal area of clamping clearance at each end was 10 mm, the effective area of the sample tested was 80×80 mm.

The sample bending handle was turned to narrow the clamping distance of the chuck to thereby bend the sample. Then the top of the bend was depressed by an indenter and the load was measured electrically.

(D) Automatic fillability test

If the stiffness of the bag is weak, the bag may bend and can not be opened when subjected to automatic filling operation in which the opening end of the bag is spread open by a sucker. So, 100 bags obtained according to (2) described above were subjected to an automatic filling test and the defective filling rate was determined.

Example 9

The procedure of Example 8 was followed except that a mixture prepared by mixing 0.03 part by weight of 2,5-dimethyl-2,5-di(t-butylperoxy)hexyne-3 with a dry blend of 90 parts by weight of a linear low-density polyethylene and 10 parts by weight of a high-pressure branched low-density polyethylene was used as starting material, and that the forming conditions shown in Table 4 were used. The results are shown in Table 4.

Example 10

The procedure of Example 8 was followed except for the use of the forming conditions shown in Table 4. The results are shown in Table 4.

Comparative Example 16

The procedure of Example 8 was followed except that a mixture prepared by mixing 0.005 part by weight of 2,5-dimethyl-2,5-di(t-butylperoxy)hexyne-3 with a dry blend of 90 parts by weight of a linear low-density polyethylene and 10 parts by weight of a high-pressure branched low-density polyethylene was used as starting material, and that this starting material was treated under the conditions shown in Table 4. The results are shown in Table 4.

Comparative Examples 17–19

The procedure of Example 8 was followed except for use of the conditions shown in Table 4. The results are shown in Table 4.

Comparative Examples 20 and 21

The procedure of Example 8 was followed except that two pieces of stretched film were placed one over the other to form a double-wall bag, and that the conditions shown in Table 4 were used. The results are shown in Table 4.

TABLE 1

| Linear polyethylene | Branched low-density polyethylene | Amount of radical | Non-stretched |
| --- | --- | --- | --- |

TABLE 1-continued

| | MI (g/10 min.) | Fluidity ratio | Density g/cm³ | Amount blended (parts) | MI (g/10 min.) | Fluidity ratio | Density g/cm³ | Amount blended (parts) | initiator (parts) | blown film forming conditions BUR | FLH/D |
|---|---|---|---|---|---|---|---|---|---|---|---|
| Example 1 | 0.5 | 20 | 0.921 | 80 | 0.4 | 45 | 0.922 | 20 | 0.03 | 3 | 8 |
| Example 2 | " | " | " | 100 | — | — | — | — | 0.03 | 3 | 15 |
| Comp. Example 1 | " | " | " | 80 | 0.4 | 45 | 0.922 | 20 | 0.03 | 3 | 15 |
| Comp. Example 2 | " | " | " | " | " | " | " | " | " | 3 | 8 |
| Comp. Example 3 | " | " | " | " | " | " | " | " | " | 1.5 | " |
| Comp. Example 4 | " | " | " | 30 | " | " | " | 70 | " | 3 | 8 |
| Comp. Example 5 | " | " | " | 80 | " | " | " | 20 | 0 | 3 | 8 |
| Comp. Example 6 | " | " | " | " | " | " | " | " | 0.03 | " | " |

| | Longitudinal monoaxial stretching conditions Stretch ratio | Temp. (°C.) | DDI (g) | Elmendorf LD Kg/cm² | Elmendorf TD Kg/cm² | Strength against finger penetration | Heat Shrinkage LD/TD |
|---|---|---|---|---|---|---|---|
| Example 1 | 3 | 80 | 780 | 39 | NT | A | 80/45 |
| Example 2 | " | " | 730 | 41 | NT | A | 79/41 |
| Comp. Example 1 | 1.3 | " | 510 | 35 | 310 | C | 58/48 |
| Comp. Example 2 | " | 100 | 460 | 7.8 | 250 | B | 56/47 |
| Comp. Example 3 | 3 | 80 | 230 | 15 | NT | C | 83/18 |
| Comp. Example 4 | 3 | 80 | 420 | 32 | 178 | C | 81/35 |
| Comp. Example 5 | 3 | 80 | 483 | 9.3 | 315 | B | 76/12 |
| Comp. Example 6 | — | — | 380 | 83 | 242 | C | 50/52 |

All the films had a thickness of 80 μm
(NT = not torn)

TABLE 2

| | Linear polyethylene MI (g/10 min.) | Fluidity ratio | Density g/cm³ | Amount blended (parts) | Branched low-density polyethylene MI (g/10 min.) | Fluidity ratio | Density g/cm³ | Amount blended (parts) | Non-stretched blown film forming conditions BUR | FLH/D |
|---|---|---|---|---|---|---|---|---|---|---|
| Example 3 | 0.3 | 70 | 0.930 | 100 | — | — | — | — | 3 | 8 |
| Example 4 | " | " | " | 80 | 0.4 | 45 | 0.922 | 20 | 3 | 15 |
| Example 5 | 0.12 | 75 | 0.921 | 80 | " | " | " | " | " | " |
| Comp. Example 7 | 0.3 | 70 | 0.930 | 80 | 0.4 | 45 | 0.922 | 20 | 3 | 15 |
| Comp. Example 8 | " | " | " | " | " | " | " | " | 3 | 8 |
| Comp. Example 9 | " | " | " | " | " | " | " | " | 1.5 | " |
| Comp. Example 10 | " | " | " | 40 | " | " | " | 70 | 3 | 8 |
| Comp. Example 11 | 0.5 | 20 | 0.921 | 80 | " | " | " | 20 | 3 | 8 |
| Comp. Example 12 | 0.3 | 70 | 0.930 | " | " | " | " | " | " | " |

| | Longitudinal monoaxial stretching conditions Stretch ratio | Temp. (°C.) | DDI (g) | Elmendorf LD kg/cm² | Elmendorf TD kg/cm² | Strength against finger penetration | Heat Shrinkage LD/TD |
|---|---|---|---|---|---|---|---|
| Example 3 | 3 | 80 | 710 | 38 | NT | A | 75/40 |
| Example 4 | " | " | 730 | 41 | NT | A | 77/46 |
| Example 5 | " | " | 780 | 39 | NT | A | 80/45 |
| Comp. Example 7 | 1.3 | " | 480 | 34 | 310 | C | 55/43 |
| Comp. Example 8 | " | 100 | 430 | 7 | 260 | B | 53/39 |
| Comp. Example 9 | 3 | 80 | 210 | 15 | NT | C | 77/19 |
| Comp. Example 10 | 3 | 80 | 425 | 32 | 180 | C | 78/33 |

TABLE 2-continued

|  |  |  |  |  |  |  |  |
|---|---|---|---|---|---|---|---|
| Comp. Example 11 | 3 | 80 | 485 | 9 | 315 | B | 76/12 |
| Comp. Example 12 | — | — | 390 | 85 | 240 | C | 47/51 |

All the films had a thickness of 80 μm
(NT = not torn)

TABLE 3

| | Linear polyethylene | | | | Branched low-density polyethylene | | | | Amount of peroxide added (parts) | Forming conditions | |
|---|---|---|---|---|---|---|---|---|---|---|---|
| | MI g/10 min | fluidity ratio | Density (g/cm³) | Amount blended (parts) | MI g/10 min | Fluidity ratio | Density (g/cm³) | Amount blended (parts) | | Draft ratio | BUR |
| Example 6 | 0.5 | 20 | 0.922 | 90 | 0.4 | 45 | 0.922 | 10 | 0 | 6.7 | 2 |
| Example 7 | " | " | " | " | " | " | " | " | 0.03 | 5 | 4 |
| Comp. Example 13 | — | — | — | — | — | — | — | — | — | — | — |
| Comp. Example 14 | 0.5 | 20 | 0.922 | 90 | 0.4 | 45 | 0.922 | 10 | 0 | 5.6 | 2 |
| Comp. Example 15 | " | " | " | " | " | " | " | " | " | 20 | 4 |

| | Stretch ratio | | Thickness (μm) | extensive paper basis weight 83 g/m² | Drop test | Transport test | | Heat Shrinkage LD/TD |
|---|---|---|---|---|---|---|---|---|
| | LD | TD | | | | break | crumble | |
| Example 6 | 1.2 | 5 | 50 | Single-wall | 7.1 | 5 | 3 | 50/83 |
| Example 7 | 4 | — | 50 | Single-wall | 6.5 | 3 | 3 | 85/43 |
| Comp. Example 13 | — | — | — | Double-wall | 4.5 | 9 | 2 | — |
| Comp. Example 14 | 1.5 | 3 | 100 | — | 7.2 | 4 | 20 | 54/76 |
| Comp. Example 15 | — | — | 50 | Single-wall | 3.8 | 14 | 3 | 41/10 |

TABLE 4

| | Linear low-density polyethylene | | | Branched low-density polyethylene | | | Amount of peroxide added (parts) | Forming conditions | | Stretch ratio | |
|---|---|---|---|---|---|---|---|---|---|---|---|
| | MI (g/10 min) | Fluidity ratio | Amount blended (parts) | MI (g/10 min) | Fluidity ratio | Amount blended (parts) | | Draft ratio | BUR | LD | TD |
| Example 8 | 0.5 | 20 | 90 | 0.4 | 45 | 10 | 0 | 67 | 2 | 1.5 | 3 |
| Example 9 | " | " | " | " | " | " | 0.03 | 3 | 4 | 3 | — |
| Example 10 | " | " | " | " | " | " | 0 | 12 | — | — | 3.5 |
| Comp. Example 16 | " | " | " | " | " | " | 0.005 | 25 | 1.2 | — | — |
| Comp. Example 17 | " | " | " | " | " | " | 0 | 6 | 2 | 3 | 1.2 |
| Comp. Example 18 | 5 | " | " | " | " | " | " | 67 | 3 | 1.5 | 3 |
| Comp. Example 19 | 0.5 | " | 10 | " | " | 90 | " | 67 | 3 | 1.5 | 3 |
| Comp. Example 20 (double-wall bag) | " | " | 90 | " | " | 10 | " | 67 | 2 | 1.5 | 5 |
| Comp. Example 21 (double-wall bag) | " | " | " | " | " | " | 0.03 | 3 | 4 | 2 | — |

| | Thickness (μm) | Heat Shrinkage | | Broken bag ratio | | Stiffness | | Deformation strength ratio | Defective filling rate (%) |
|---|---|---|---|---|---|---|---|---|---|
| | | LD | TD | sidewise (seal strength) | Lengthwise (body strength) | LD | TD | | |
| Example 8 | 100 | 55 | 76 | 0 | 0 | 1.1 | 1.4 | 1.14 | 10 |

TABLE 4-continued

| | | | | | | | | | |
|---|---|---|---|---|---|---|---|---|---|
| Example 9 | " | 81 | 45 | 0 | 0 | 1.3 | 0.95 | 1.10 | 8 |
| Example 10 | " | 40 | 81 | 0 | 0 | 1.0 | 1.5 | 1.20 | 12 |
| Comp. Example 16 | " | 80 | −39 | 0 | 80 | — | — | — | |
| Comp. Example 17 | " | 81 | 15 | 0 | 60 | — | — | — | |
| Comp. Example 18 | " | 47 | 60 | 50 | 20 | — | — | — | |
| Comp. Example 19 | " | 48 | 75 | 60 | 100 | — | — | — | |
| Comp. Example 20 (double-wall bag) | 50μ × 2 | 52 | 76 | 0 | 0 | 0.4 | 0.47 | 1.35 | 24 |
| Comp. Example 21 (double-wall bag) | 50μ × 2 | 77 | 38 | 0 | 0 | 0.52 | 0.41 | 1.38 | 30 |

What is claimed is:

1. A packaging bag comprising an outer bag made of paper and an inner bag made of a monoaxially or biaxially stretched film having a heat shrinkage of 20% or more in one of the longitudinal and transverse directions and 60% or more in the other direction and comprising 100 to 50 parts by weight of a linear polyethylene having a density of 0.910 to 0.965 g/cm$^3$, a melt index of 2 g/10 min or below and a fluidity ratio of 120 or below; 0 to 50 parts by weight of a branched low-density polyethylene having a melt index of 2 g/10 min or below, a fluidity ratio of 70 or below and a density of 0.930 g/cm$^3$ or below; and 0.0001 to 0.1 part by weight of a radical initiator as an optional component.

2. A packaging bag according to claim 1, wherein said monoaxially stretched film is produced by a process comprising the steps of:

forming a non-stretched film or sheet by blow-extruding a composition comprising 100 to 50 parts by weight of a linear polyethylene having a density of 0.910 to 0.965 g/cm$^3$, a melt index of 2 g/10 min. or below and a fluidity ratio of 50 or below; 0 to 50 parts by weight of a branched low-density polyethylene having a density of 0.930 g/cm$^3$ or below, a melt index of 2 g/10 min. or below and a fluidity ratio of 70 or below; and 0.0001 to 0.1 part by weight of a radical initiator as an optional component, under the condition of blow-up ratio of 2 to 8 and frost line height of 2 to 50 times the die diameter while or after decomposing said radical initiator if present and reacting with said linear polyethylene and branched low-density polyethylene, and monoaxially stretching the non-stretched film or sheet 1.5 to 8 times in the longitudinal direction at a temperature of Tm-70 to Tm-20° C., wherein Tm is the melting point of said composition or a modified composition obtained from said composition by the action of said radical initiator.

3. A packaging bag according to claim 1, wherein said monoaxially or biaxially stretched film is produced by a process comprising the steps of:

forming a non-stretched film or sheet by blown film forming method or T-die method from a composition comprising 100 to 50 parts by weight of a linear polyethylene having a density of 0.910 to 0.965 g/cm$^3$, a melt index of 2 g/10 min. or below and a fluidity ratio of 50 or below; 0 to 50 parts by weight of a branched low-density polyethylene having a density of 0.930 g/cm$^3$ or below, a melt index of 2 g/10 min. or below and a fluidity ratio of 70 or below; and 0.0001 to 0.1 part by weight of a radical initiator as an optional component, under the condition of a resin temperature from 150° to 250° C. and a draft ratio of 1 to 50 while or after decomposing said radical initiator and reaction with said linear polyethylene and branched low-density polyethylene, and monoaxially or biaxially stretching the non-stretched film or sheet 1.2 to 9 times the original area at a temperature of Tm-70 to Tm-5° C., wherein Tm is the melting point of said composition or a modified composition obtained from said composition by the action of said radical initiator.

4. The packaging bag according to claim 3, wherein said monoaxially or biaxially stretching is carried out by monoaxially stretching said non-stretched film or sheet 1.2 to 9 times in the transverse direction or biaxially stretching said non-stretched film or sheet 1.2 to 3 times in the longitudinal direction and 3 to 7.5 times in the transverse direction.

5. A packaging bag according to claim 1, wherein said monoaxially stretched film is produced by a process comprising the steps of:

forming a non-stretched film or sheet by blow-extruding a composition comprising 100 to 50 parts by weight of a linear polyethylene having a density of 0.91 to 0.965 g/cm$^3$, a melt index of 2 g/10 min. or below a fluidity ratio of higher than 50 and not higher than 120 and 0 to 50 parts by weight of a branched low-density polyethylene having a density of 0.930 g/cm$^3$ or below, a melt index of 2 g/10 min. or below and a fluidity ratio of 70 or below, under the conditions of blow-up ratio of 2 to 8 and frost line height of 2 to 50 times the die diameter, and monoaxially stretching said non-stretched film or sheet 1.5 to 8 times in the film take-up direction at a temperature of Tm-70° C. to Tm-20° C. wherein Tm is the melting point of said composition.

* * * * *